(12) United States Patent
Lee (10) Patent No.: US 6,680,147 B2
(45) Date of Patent: Jan. 20, 2004

(54) LITHIUM BATTERY

(75) Inventor: Yong-beom Lee, Seoul (KR)

(73) Assignee: Samsung SDI Co., Ltd., Suwon (KR)

( * ) Notice: Subject to any disclaimer, the term of this patent is extended or adjusted under 35 U.S.C. 154(b) by 334 days.

(21) Appl. No.: 09/938,302

(22) Filed: Aug. 24, 2001

(65) Prior Publication Data

US 2002/0028388 A1 Mar. 7, 2002

(30) Foreign Application Priority Data

Sep. 5, 2000 (KR) ........................................ 2000-52364
Sep. 5, 2000 (KR) ........................................ 2000-52365

(51) Int. Cl.[7] ................................................ H01M 6/14
(52) U.S. Cl. ...................... 429/303; 429/302; 429/300; 429/231.9; 429/231.95
(58) Field of Search ......................... 429/231.9, 231.95, 429/300, 302, 303

(56) References Cited

U.S. PATENT DOCUMENTS

| 5,279,910 | A | 1/1994 | Sasaki et al. ................ 429/213 |
| 5,340,368 | A | 8/1994 | Koksbang et al. ......... 29/623.5 |
| 5,437,942 | A | 8/1995 | Murata et al. .............. 429/192 |
| 5,972,539 | A | 10/1999 | Hasegawa et al. .......... 429/304 |

*Primary Examiner*—Bruce F. Bell
(74) *Attorney, Agent, or Firm*—Staas & Halsey LLP (57) ABSTRACT

A lithium battery which includes an electrode assembly having a cathode, an anode and a separator interposed between the cathode and the anode, a gel electrolyte prepared by curing a composition consisting of a polysiloxane compound or a polysiloxane-polyoxyalkylene compound, a polyethylene glycol derivative, and an organic solvent containing a lithium salt. The lithium battery has improved reliability and safety since a swelling phenomenon due to an electrolytic solution is effectively suppressed and leakage of the electrolytic solution is prevented.

26 Claims, 3 Drawing Sheets

LITHIUM BATTERY

CROSS-REFERENCE TO RELATED APPLICATIONS

This application claims the benefit of Korean Application Nos. 00-52364, filed Sep. 5, 2000 and 00-52365, filed Sep. 5, 2000, in the Korean Patent Office, the disclosures of which are incorporated herein by reference.

BACKGROUND OF THE INVENTION

1. Field of the Invention

The present invention relates to a lithium battery, and more particularly, to a lithium battery having improved safety and reliability by using a gel electrolyte.

2. Description of the Related Art

Lithium secondary batteries generate electricity by lithium ions migrating between a cathode and an anode. The lithium secondary batteries have higher energy density per volume and have a higher voltage, than lithium cadmium batteries or nickel hydrogen batteries. Also, the lithium secondary batteries are lightweight, compared to lithium cadmium batteries or nickel hydrogen batteries, that is, approximately one half as heavy. Thus, the lithium secondary batteries are well adapted for miniaturization and long-time use in electronic appliances.

As described above, since the lithium secondary batteries have higher voltage characteristics and better charging/discharge cycle life than conventional nickel cadmium batteries or nickel hydrogen batteries, without causing environmental problems, much attention has been paid thereto as the most promising high-performance batteries. However, it is a critical issue to attain safety due to danger of explosion of a lithium secondary battery.

Lithium secondary batteries are classified according to the kind of electrolyte used, into lithium ion batteries and lithium ion polymer batteries. The lithium ion batteries generally use a cylindrical case or prismatic case as the case for sealing an electrode assembly. However, recently, a pouch has been in widespread use instead of such a case. The reason of using a pouch as a case is that the energy density per weight and volume increases, thin and lightweight batteries can be attained, and the material cost for the case can be reduced.

Figure 1:
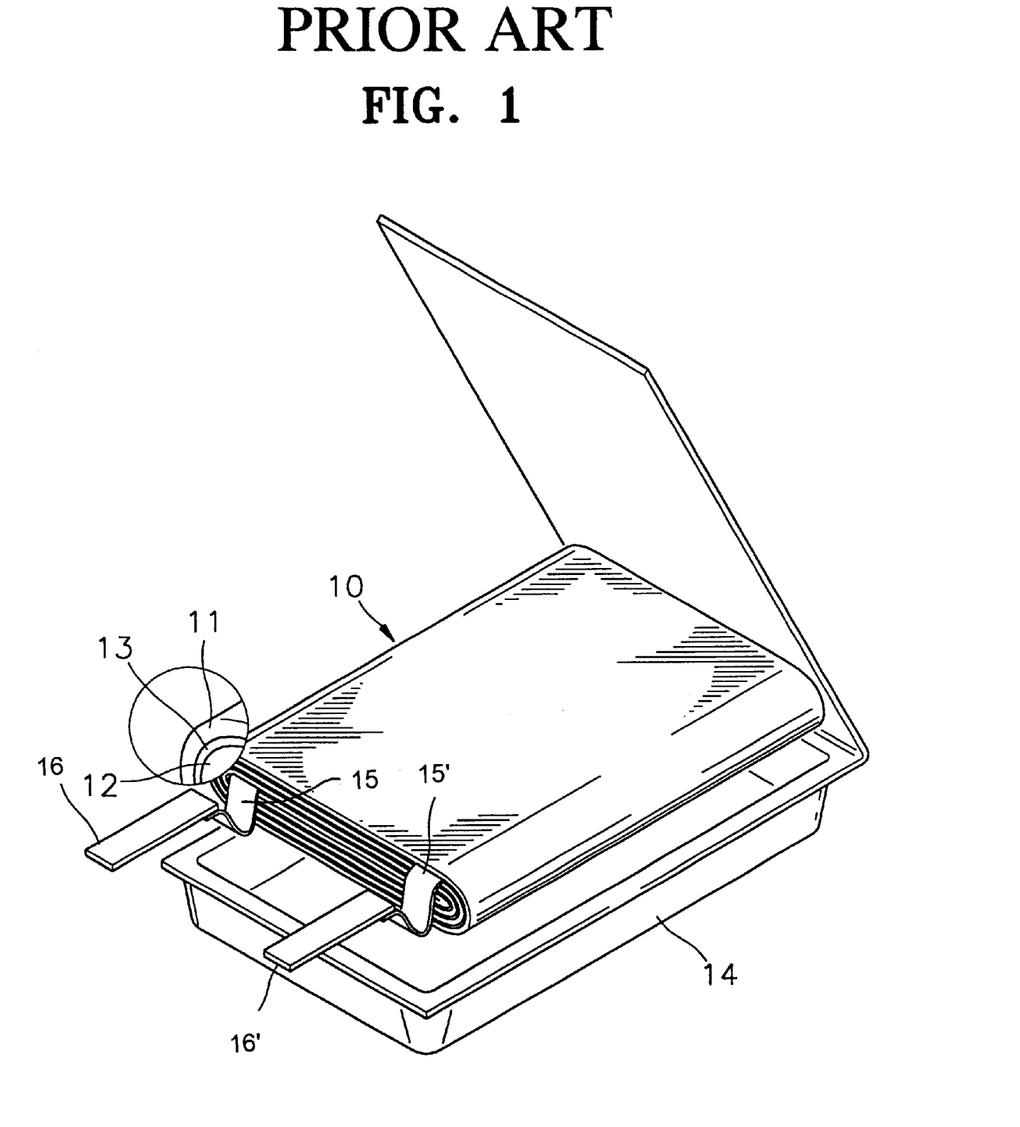
FIG. 1 is a partially exploded perspective view illustrating an example of a conventional lithium ion battery.

FIG. 1 is an exploded perspective view showing an example of a lithium ion battery using a pouch as a case.

Referring to FIG. 1, a lithium ion battery includes an electrode assembly 10 having a cathode 11, an anode 12 and a separator 13, and a case 14 surrounding and hermetically sealing the electrode assembly 10. Here, the electrode assembly 10 is formed such that the separator 13 is interposed between the cathode 11 and the anode 12 and wound. A cathode tap 15 and an anode tap 15', serving as electrical passageways between the electrode assembly 10 and the outside, are drawn from the cathode 11 and the anode 12, respectively, to form electrode terminals 16 and 16'.

Figure 2:
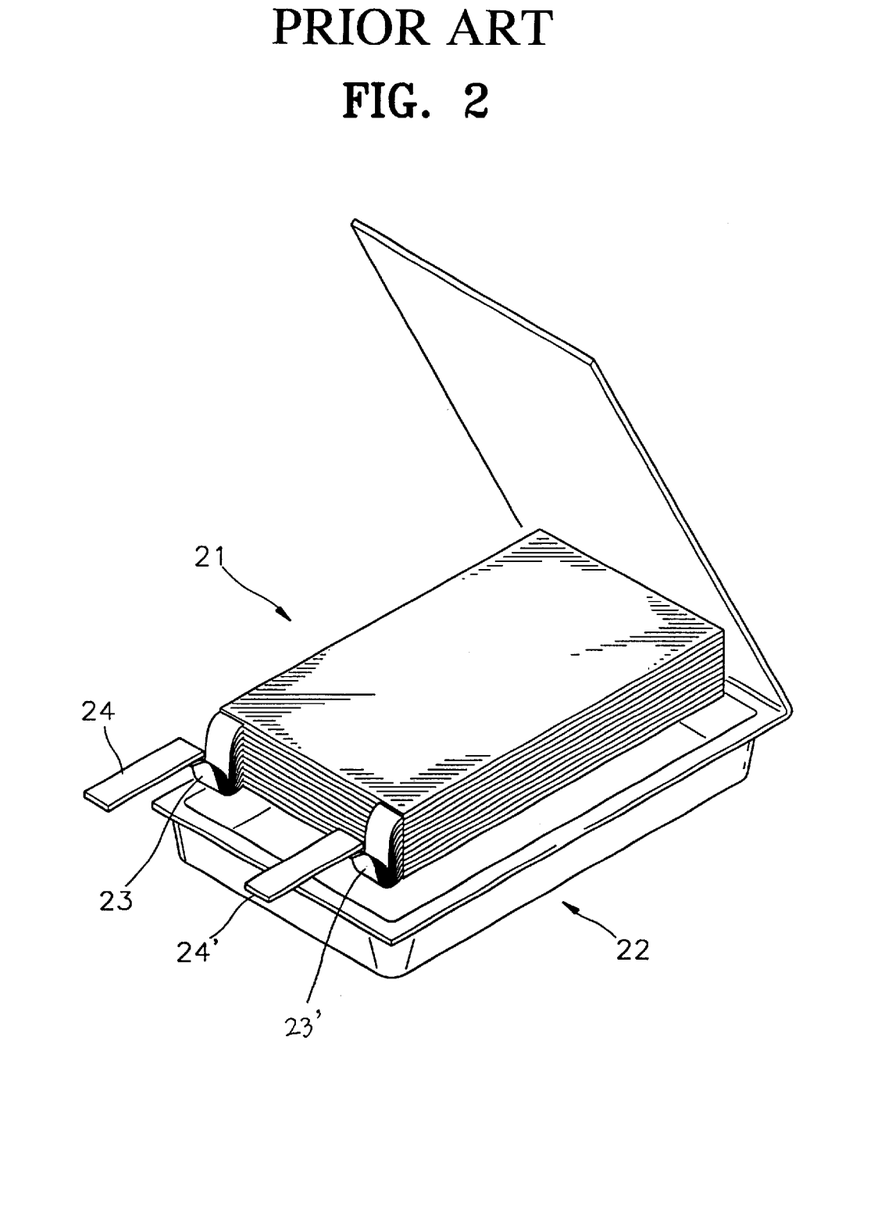
FIG. 2 is an exploded perspective view illustrating an example of a conventional lithium ion polymer battery.

FIG. 2 is an exploded perspective view showing an example of a conventional lithium ion polymer battery.

Referring to FIG. 2, the lithium ion polymer battery includes an electrode assembly 21 having a cathode, an anode and a separator, and a case 22 surrounding and hermetically sealing the electrode assembly 21. Electrode terminals (or lead wires) 24 and 24', serving as electrical passageways for inducing the current formed at the electrode assembly 21 to the outside, are connected to a cathode tap 23 and an anode tap 23' provided at the cathode and the anode, respectively, and are exposed outside the case 22 by a predetermined length.

As described above, in the lithium ion battery shown in FIG. 1 and the lithium ion polymer battery shown in FIG. 2, the electrode assemblies 10 and 21 are put into the cases 14 and 22 and an electrolytic solution is injected therein, with the electrode terminals 13 and 13' and 24 and 24' being partially exposed. Then, heat and pressure are applied so that the thermally adhesive materials in the edges of upper and lower case parts are adhered to be sealed, thereby completing the battery.

As described above, since the electrolytic solution is injected during a subsequent process to the one in which the electrode assemblies are put into the cases, in the case of using an organic solvent having a low melting point, the electrode assembly or pouch may swell, resulting in deterioration in the reliability and safety of the battery.

To solve the above-described problems, there have been proposed several methods of fabricating batteries such that plain batteries are cured by UV rays or electron beams, or electrode plates are coated with gel without separately injecting an electrolytic solution, as disclosed in U.S. Pat. Nos. 5,972,539, 5,279,910, 5,437,942 and 5,340,368. In practice, swelling of an electrode assembly or pouch can be somewhat mitigated, which is, however, not yet satisfactory.

SUMMARY OF THE INVENTION

To solve the above problems, it is a first object of the present invention to provide a polymeric gel electrolyte which can effectively suppress swelling of a battery due to an electrolytic solution.

It is another object of the present invention to provide a lithium battery which has improved reliability and safety by employing the polymeric gel electrolyte.

Additional objects and advantages of the invention will be set forth in part in the description which follows and, in part, will be obvious from the description, or may be learned by practice of the invention.

To achieve the above and other objects, there is provided a polymeric gel electrolyte prepared by curing a composition comprising a polysiloxane compound represented by formula 1 or a polysiloxane-polyoxyalkylene compound represented by formula 2, a polyethylene glycol derivative represented by formula 3, and an organic solvent containing a lithium salt:

[Formula 1]

[Formula 2]

[Formula 3]

wherein R1 is —C(=O)CR$_8$=CR$_9$R$_{24}$ or —CR$_{10}$R$_{11}$R$_{25}$, R$_2$ and R$_3$ are independently one selected from the group consisting of C$_a$H$_{(2a+1)}$ in which a is an integer from 1 to 5, phenyl, benzyl and allyl, R$_4$ is one selected from the group consisting of —C(=O)CR$_{12}$=CR$_{13}$R$_{14}$, —CR$_{15}$R$_{16}$R$_{17}$ and —C$_a$H$_{(2a+1)}$ (here, a is an integer from 1 to 5), R$_5$ and R$_7$ are independently —C(O)CR$_{18}$=C(R$_{19}$R$_{20}$) or —CR$_{21}$(R$_{22}$R$_{23}$), R$_6$ is hydrogen or —C$_a$H$_{(2a+1)}$ (here, a is an integer from 1 to 5), m is an integer from 1 to 5, n is an integer from 1 to 20, x is an integer from 1 to 15, and $R_8$, $R_9$, $R_{10}$, $R_{11}$, $R_{12}$, $R_{13}$, $R_{14}$, $R_{15}$, $R_{16}$, $R_{17}$, $R_{18}$, $R_{19}$, $R_{20}$, $R_{21}$, $R_{22}$, $R_{23}$, $R_{24}$ and $R_{25}$ are independently hydrogen or —$C_bH_{(2b+1)}$ in which b is an integer from 1 to 5, R' is hydrogen or $CH_3$, and R" is hydrogen, —C(=O)CH=CH$_2$ or —C(=O)C(CH$_3$)=CH$_2$.

The polyethylene glycol derivative represented by formula 3 is at least one selected from the group consisting of polyethylene glycol monomethacrylate, polyethylene glycol dimethacrylate, polyethylene glycol monoacrylate and polyethylene glycol diacrylate. Also, the composition may further include ethoxylated trimethylolpropane triacrylate. In the composition, the content of the polysiloxane compound represented by formula 1 or the polysiloxane-polyoxyalkylene compound represented by formula 2 is preferably 0.1 to 10 parts by weight based on 100 parts by weight of the composition. The content of the polyethylene glycol derivative represented by formula 3 is preferably 0.4 to 50 parts by weight based on 100 parts by weight of the composition. The content of the ethoxylated trimethylolpropane triacrylate is greater than 0 parts by weight and less than or equal to 5 parts by weight based on 100 parts by weight of the composition.

To achieve the above and other objects of the present invention, there is provided a lithium battery including an electrode assembly having a cathode, an anode and a separator interposed between the cathode and the anode, a gel electrolyte formed by curing a composition comprising a polysiloxane compound represented by formula (1) or a polysiloxane-polyoxyalkylene compound represented by formula (2), polyethylene glycol derivative represented by formula (3), and an organic solvent containing lithium salt, and a case accommodating the electrode assembly and the gel electrolyte:

[Formula 1]

$$R_1-O-(CH_2)_m-[Si(R_2R_3)-O]_n-Si(R_2R_3)-(CH_2)_n-O-R_4$$

[Formula 2]

$$R_5-O-(CH_2)_m-[Si(R_2R_3)-O]_n-Si(R_2R_3)-(CH_2)_m-O-(CH_2-CHR_6-O-)_x-R_7$$

[Formula 3]

$$H_2C=C(R')C(=O)(OCH_2CH_2)n-OR''$$

wherein R1 is —C(=O)CR$_8$=CR$_9$R$_{24}$ or —CR$_{10}$R$_{11}$R$_{25}$, R$_2$ and R$_3$ are independently one selected from the group consisting of $C_aH_{(2a+1)}$ in which a is an integer from 1 to 5, phenyl, benzyl and allyl, R$_4$ is one selected from the group consisting of —C(=O)CR$_{12}$=CR$_{13}$R$_{14}$, —CR$_{15}$R$_{16}$R$_{17}$ and —$C_aH_{(2a+1)}$ (here, a is an integer from 1 to 5), R$_5$ and R$_7$ are independently —C(O)CR$_{18}$=C(R$_{19}$R$_{20}$) or —CR$_{21}$(R$_{22}$R$_{23}$), R$_6$ is hydrogen or —$C_aH_{(2a+1)}$ (here, a is an integer from 1 to 5), m is an integer from 1 to 5, n is an integer from 1 to 20, x is an integer from 1 to 15, and R$_8$, R$_9$, R$_{10}$, R$_{11}$, R$_{12}$, R$_{13}$, R$_{14}$, R$_{15}$, R$_{16}$, R$_{17}$, R$_{18}$, R$_{19}$, R$_{20}$, R$_{21}$, R$_{22}$, R$_{23}$, R$_{24}$ and R$_{25}$ are independently hydrogen or —$C_bH_{(2b+1)}$ in which b is an integer from 1 to 5, R' is hydrogen or CH$_3$, and R" is hydrogen, —C(=O)CH=CH$_2$ or —C(=O)C(CH$_3$)=CH$_2$.

In the lithium battery, the composition preferably further includes 0.1 to 5 parts by weight of at least one polymerization initiator selected from the group consisting of benzophenone, benzoyl peroxide, acetyl peroxide, lauroyl peroxide and azobisisobutyronitrile, based on 100 parts by weight of the composition.

In the lithium battery, the curing is preferably performed by at least one method selected from the group consisting of thermal polymerization, electron beam polymerization and UV polymerization, and the thermal polymerization is preferably performed at a temperature in the range from 60 to 100° C.

Also, the lithium salt is preferably at least one selected from the group consisting of lithium perchlorate (LiClO$_4$), lithium tetrafluoroborate (LiBF$_4$), lithium hexafluorophosphate (LiPF$_6$), lithium hexafluoroarsenate (LiAsF$_6$), lithium trifluoromethanesulfonate (LiCF$_3$SO$_3$) and lithium bistrifluoromethanesulfonyl amide (LiN(CF$_3$SO$_2$)$_2$)

Further, the organic solvent is preferably at least one solvent selected from the group consisting of propylene carbonate, ethylene carbonate, dimethyl carbonate, methylethyl carbonate, diethyl carbonate, vinylene carbonate, triglyme, tetraglyme and y-butyrolactone.

The electrode assembly may be a winding type and the case may be a pouch. Also, the separator may be formed of a polyethylene sheet, a polypropylene sheet or a combination thereof.

BRIEF DESCRIPTION OF THE DRAWINGS

The above objects and advantages of the present invention will become more apparent by describing in detail preferred embodiments thereof with reference to the attached drawings in which.

DESCRIPTION OF THE PREFERRED EMBODIMENTS

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

The conventional polymeric gel electrolyte is formed of a polymer having polyalkylene oxide such as polyethylene oxide or polypropylene oxide as their main chains and having functional groups such as an acryl, vinyl or epoxy group. In the present invention, the physical and electrochemical properties of an electrolyte have been improved by using a polysiloxane compound or a polysiloxane-polyoxyalkylene compound containing a siloxane unit and/or an oxyalkylene unit, in addition to polyalkylene oxides.

The gel electrolyte according to the present invention is prepared by curing a composition comprising a polysiloxane compound represented by formula (1) or a polysiloxane-polyoxyalkylene compound represented by formula (2), a polyethylene glycol derivative represented by formula (3), and an organic solvent containing lithium salt:

[Formula 1]

$$R_1-O-(CH_2)_m-[Si(R_2R_3)-O]_n-Si(R_2R_3)-(CH_2)_n-O-R_4$$

[Formula 2]

$$R_5O-(CH_2)_m-[Si(R_2R_3)-O]_n-Si(R_2R_3)-(CH_2)_m-O-(CH_2-CHR_6-O-)-R_7$$

[Formula 3]

wherein R1 is —C(=O)CR$_8$=CR$_9$R$_{24}$ or —CR$_{10}$R$_{11}$R$_{25}$, R$_2$ and R$_3$ are independently one selected from the group consisting of C$_a$H$_{(2a+1)}$ in which a is an integer from 1 to 5, phenyl, benzyl and allyl, R$_4$ is one selected from the group consisting of —C(=O)CR$_{12}$=CR$_{13}$R$_{14}$, —CR$_{15}$R$_{16}$R$_{17}$ and —C$_a$H$_{(2a+1)}$ (here, a is an integer from 1 to 5), R$_5$ and R$_7$ are independently —C(O)CR$_{18}$=C(R$_{19}$R$_{20}$) or —CR$_{21}$(R$_{22}$R$_{23}$), R$_6$ is hydrogen or —C$_a$H$_{(2a+1)}$ (here, a is an integer from 1 to 5), m is an integer from 1 to 5, n is an integer from 1 to 20, x is an integer from 1 to 15, and R$_8$, R$_9$, R$_{10}$, R$_{11}$, R$_{12}$, R$_{13}$, R$_{14}$, R$_{15}$, R$_{16}$, R$_{17}$, R$_{18}$, R$_{19}$, R$_{20}$, R$_{21}$, R$_{22}$, R$_{23}$, R$_{24}$ and R$_{25}$ are independently hydrogen or —C$_b$H$_{(2b+1)}$ in which b is an integer from 1 to 5, R' is hydrogen or CH$_3$, and R'' is hydrogen, —C(=O)CH=CH$_2$ or —C(=O)C(CH$_3$)=CH$_2$.

Here, the polyethylene glycol derivative represented by formula (3) in the composition is selected from the group consisting of polyethylene glycol monomethacrylate, polyethylene glycol dimethacrylate, polyethylene glycol monoacrylate, polyethylene glycol diacrylate and mixtures thereof.

In formula (1), n is an integer of 1 through 20, preferably 1 through 10, from the viewpoints of solubility, reactivity and battery performance.

The composition may further include ethoxylated trimethylolpropane triacrylate. In the composition, the content of the polysiloxane compound represented by formula 1 or the polysiloxane-polyoxyalkylene compound represented by formula 2 is preferably 0.1 to 10 parts by weight based on 100 parts by weight of the composition. If the content of the polysiloxane compound represented by formula 1 or the polysiloxane-polyoxyalkylene compound represented by formula 2 is less than 0.1 parts by weight, based on 100 parts by weight of the composition, the effect of improving the battery performance is negligible, and if greater than 10 parts by weight, the battery performance may deteriorate. The content of the polyethylene glycol derivative is preferably 0.4 to 50 parts by weight based on 100 parts by weight of the composition. If the content of the polyethylene glycol derivative is less than 0.4 parts by weight, the curability is lowered, and if greater than 100 parts by weight, the battery performance may deteriorate. The polyethylene glycol derivative is preferably a mixture of polyethylene glycol dimethacrylate and polyethylene glycol monomethacrylate. Here, the content of the polyethylene glycol dimethacrylate is preferably 0.5 to 50 parts by weight based on 100 parts by weight of the composition, and the content of the polyethylene glycol monomethacrylate is preferably 0.4 to 50 parts by weight based on 100 parts by weight of the composition.

If the ethoxylated trimethylolpropane triacrylate is added to the composition, the effect of improving curability can be achieved, compared to the case where the methylated trimethylolpropane triacrylate is not added to the composition. The content of the methylated trimethylolpropane triacrylate is preferably greater than 0 and less than or equal to 5 parts by weight, based on 100 parts by weight of the composition.

In the composition for forming the polymeric gel electrolyte according to the present invention, the organic solvent containing a lithium salt is preferably 50 to 97 parts by weight, based on 100 parts by weight of the composition, and 4 to 15 mol of lithium salt is preferably contained therein. If the content of the organic solvent is out of this range, the battery performance may deteriorate.

The composition may further include at least one polymerization initiator selected from the group consisting of benzophenone, benzoyl peroxide, acetyl peroxide, lauryl peroxide and azobisisobutyronitrile. Here, the content of the polymerization initiator is in the generally accepted range, that is, 0.1 to 5 parts by weight based on 100 parts by weight of the composition.

The process of preparing a gel electrolyte using the composition will now be described.

A polysiloxane compound represented by formula (1) or a polysiloxane-polyoxyalkylene compound represented by formula (2) may be prepared by various methods. For example, the polysiloxane compound can be prepared by the reaction between dihydroxy-terminated polysiloxane and acryloyl chloride. The polysiloxane-polyoxyalkylene compound can be prepared by the reaction between acryloyl chloride and polysiloxane-polyoxyalkylene produced by reacting the dihydroxy-terminated polysiloxane with ethylene oxide.

The polysiloxane compound represented by formula (1) or the polysiloxane-polyoxyalkylene compound represented by formula (2), a polyethylene glycol derivative represented by formula (3), and ethoxylated trimethylol propane triacrylate are mixed in the ratio stated above. The ratio is optimally selected in consideration of electrochemical safety and battery performance of the lithium battery.

At least one polymerization initiator selected from the group consisting of benzophenone, benzoyl peroxide, acetyl peroxide, lauroyl peroxide and azobisisobutyronitrile, may be further included in the composition.

Next, an organic solvent containing a lithium salt is further added to the composition and the mixture is stirred to be homogeneously mixed.

Then, the mixture is polymerized by thermal polymerization, electron beam polymerization or UV polymerization to obtain a gel electrolyte. In the case of employing thermal polymerization, the polymerization temperature is preferably in the range from 60 to 100° C.

Any lithium salt and organic solvent that are well known in the art without limitation can be used as the lithium salt and organic solvent included in the electrolyte in the present invention. The lithium salt is preferably at least one selected from the group consisting of LiClO$_4$, LiBF$_4$, LiPF$_6$, LiAsF$_6$, LiCF$_3$SO$_3$ and LiN(CF$_3$SO$_4$)$_2$. The organic solvent is preferably selected from the group consisting of propylene carbonate, ethylene carbonate, dimethyl carbonate, methylethyl carbonate, diethyl carbonate, vinylene carbonate, triglyme, tetraglyme, γ-butyro lactone.

A method of preparing a lithium battery comprising the electrolytic solution according to the present invention will now be described.

First, an electrode active material layer is formed on a current collector using an electrode active material composition comprising an electrode active material, a binder, a conductive agent and a solvent. Here, the electrode active material layer is formed by directly coating the electrode active material composition on the current collector. Otherwise, the electrode active material composition may be coated on a separate support body and dried, and then a film peeled off from the support body may be laminated on the current collector. Here, any one that can support the active material layer can be used as the support body, and detailed examples thereof include a mylar film or polyethylene terephthalate (PET) film.

In the present invention, lithium composite oxides such as LiCoO$_2$ can be used as the active material for a cathode and carbon or graphite can be used as the active material for an anode. Also, carbon black is used as the conductive agent. Here, the content of the conductive agent is preferably 1 to 20 parts by weight based on the 100 parts by weight of an electrode active material, e.g., $LiCoO_2$. If the content of the conductive agent is greater than 20 parts by weight, the conductivity of the electrode active material layer is relatively reduced. If the content of the conductive agent is less than 1 parts by weight, the content of the electrode active material is undesirably reduced.

Vinylidenefluoride-hexafluoropropylene (VdF/HFP) copolymer, polyvinylidenefluoride, polyacrylonitrile, polymethylmethacrylate and mixtures thereof are used as the binder, and the content thereof is preferably 2 to 30 parts by weight based on 100 parts by weight of the electrode active material. When the content of the binder is within the range, the adhesion between the current collector and the electrode active material layer is excellent.

All solvents for use in the conventional lithium battery can be used as the solvent, and detailed examples thereof include acetone and N-methylpyrrolidone.

The separator of the present invention is not specifically limited and usable separators include an easily windable polyethylene separator and polypropylene/polyethylene/polypropylene three-layered separator.

The separator is interposed between the cathode and anode plates prepared in the above-described manner, and wound by a jelly-roll method to form an electrode assembly (FIG. 1) or a bi-cell electrode assembly (FIG. 2). Subsequently, the electrode assembly is put into a case.

Next, a composition comprising 0.1 to 10 parts by weight of the polysiloxane compound represented by formula (1) or the polysiloxane-polyoxyalkylene compound represented by formula (2), 0.4 to 100 parts by weight of a polyethylene glycol derivative, specifically a mixture of 0.5 to 50 parts by weight of polyethylene glycol dimethacrylate and 0.4 to 50 parts by weight of polyethylene glycol monomethacrylate, greater than 0 and less than or equal to 5 parts by weight of ethoxylated trimethylolpropane triacrylate and 50 to 97 parts by weight of an organic solvent containing a lithium salt, is injected the case. Alternatively, the composition may further comprise 0.1 to 5 parts by weight of at least one polymerization initiator selected from the group consisting of benzophenone, benzoyl peroxide, acetyl peroxide, lauroyl peroxide and azobisisobutyronitrile, is injected into the case.

Thereafter, the case is hermetically sealed and then the resultant is allowed to stand at an oven maintained at a predetermined temperature for a predetermined time. Here, the oven is preferably maintained at a temperature in the range from 60 to 100° C.

Then, as the result of the reaction, a gel electrolyte can be obtained. If the electrolytic solution exists in a gel type, it is unlikely to be leaked outside, thereby improving the safety and reliability of the battery by preventing leakage of any electrolytic solution.

In an alternative embodiment of the present invention, a lithium battery can be manufactured as follows. A composition comprising a polysiloxane compound represented by formula (1) or a polysiloxane-polyoxyalkylene compound represented by formula (2), a polyethylene glycol derivative represented by formula (3), ethoxylated trimethylolpropane triacrylate, an organic solvent containing lithium salt, and at least one polymerization initiator selected from the group consisting of benzophenone, benzoyl peroxide, acetyl peroxide, lauroyl peroxide and azobisisobutyronitrile, may be cast and then polymerized using electron beams or UV. Here, the contents of various components of the composition are as described above.

The lithium batteries according to the present invention are not specifically limited in type, and includes both lithium primary batteries and lithium secondary batteries. The lithium secondary batteries include lithium ion polymer batteries, lithium ion batteries and the like.

The present invention will now be described through the following examples and is not limited thereto.

EXAMPLE 1

15 g of polyvinylidenefluoride was added to 600 ml of acetone and mixed using a ball mill for 2 hours to be dissolved. 470 g of $LiCoO_2$, and 15 g of Super-P were added to the mixture and then mixed for 5 hours to form a cathode active material composition.

The cathode active material composition was coated on an aluminum foil having a thickness of 147 μm and a width of 4.9μ μm m using a doctor blade having a gap of 320 μm, and then dried to make a unit cathode plate.

Then, an anode plate was manufactured as follows.

50 g of polyvinylidenefluoride was added to 600 ml of acetone and mixed using a ball mill for 2 hours to be dissolved. 449 g of mezocarbon fiber (MCF) and 1 g of oxalic acid were added to the mixture and then mixed for 5 hours to form an anode active material composition.

The anode active material composition was coated on a copper foil having a thickness of 178 μm and a width of 5.1 cm using a doctor blade having a gap of 420 μm, and then dried to make a unit anode plate.

Separately from the above, a polyethylene separator (Asahi Chemical Industry Co., Ltd.) was used as a separator. Here, the width of the separator was 5.25 cm and the thickness thereof was 18 μm.

The polyethylene separator was interposed between the cathode and the anode and then wound in a jelly-roll type configuration to fabricate an electrode assembly. The fabricated electrode assembly was put into a pouch.

0.2 g of a polysiloxane compound represented by formula (1) wherein m is 3, n is 3, $R_1$, $R_2$ and $R_3$ are independently a methyl group, and $R_4$ is $CH_2=C(CH_3)-C(=O)$, 1.8 g of polyethylene glycol dimethacrylate, 0.5 g of polyethylene glycol monomethacrylate, 0.5 g of ethoxylated trimethyolpropane triacrylate, 0.1 g of azobisisobutyronitrile and 30 g of a solution containing 1M $LiPF_6$ and EC/DMC/DEC in a mixture ratio by volume of 3:3:1, were mixed to prepare a gel electrolyte forming composition. 3 g of the composition was injected into the obtained pouch battery and hermetically sealed. Subsequently, the resultant was allowed to stand in an oven maintained at 80° C. for 4 hours, thereby completing a lithium secondary battery.

EXAMPLE 2

15 g of polyvinylidenefluoride was added to 600 ml of acetone and mixed using a ball mill for 2 hours to be dissolved. 470 g of $LiCoO_2$, and 15 g of Super-P were added to the mixture and then mixed for 5 hours to form a cathode active material composition.

The cathode active material composition was coated on an aluminum foil having a thickness of 147 μm and a width of 4.9 cm using a doctor blade having a gap of 320 μm, and then dried to make a unit cathode plate.

Next, a composition comprising 0.2 g of the polysiloxane compound represented by formula (1), which is the same as in Example 1, 1.8 g of polyethylene glycol dimethacrylate, 0.5 g of polyethylene glycol monomethacrylate, 0.5 g of ethoxylated trimethylolpropane triacrylate, 0.1 g of benzophenone and a solution containing 1M LiPF$_6$ and EC/DMC/DEC in a mixture ratio by volume of 3:3:1, were mixed to prepare a gel electrolyte forming composition. Subsequently, the composition was cast on the cathode plate using a doctor blade and then hardened by irradiating UV.

Then, an anode plate was fabricated as follows.

50 g of polyvinylidenefluoride was added to 600 ml of acetone and mixed using a ball mill for 2 hours to be dissolved. 449 g of mezocarbon fiber (MCF) and 1 g of oxalic acid were added to the mixture and then mixed for 5 hours to form an anode active material composition.

The anode active material composition was coated on a copper foil having a thickness of 178 μm and a width of 5.1 cm using a doctor blade having a gap of 420 μm, and then dried to make a unit anode plate.

Separately from the above, a polyethylene separator (Asahi Chemical Industry Co., Ltd.) was used as a separator. Here, the width of the separator was 5.25 cm and the thickness thereof was 18 μm.

The polyethylene separator was interposed between the cathode and the anode and then wound in a jelly-roll type configuration to fabricate an electrode assembly. The fabricated electrode assembly was put into a pouch, thereby completing a lithium secondary battery.

EXAMPLE 3

A lithium secondary battery was completed in the same manner as Example 2, except that the gel electrolyte forming composition was cast on an anode plate rather than a cathode plate.

EXAMPLE 4

A lithium secondary battery was completed in the same manner as Example 2, except that the gel electrolyte forming composition was cast on both a cathode plate and an anode plate.

EXAMPLE 5

15 g of polyvinylidenefluoride was added to 600 ml of acetone and mixed using a ball mill for 2 hours to be dissolved. 470 g of LiCoO$_2$, and 15 g of Super-P were added to the mixture and then mixed for 5 hours to form a cathode active material composition.

The cathode active material composition was coated on an aluminum foil having a thickness of 147 μm and a width of 4.9 cm using a doctor blade having a gap of 320 μm, and then dried to make a unit cathode plate.

Then, an anode plate was manufactured as follows.

50 g of polyvinylidenefluoride was added to 600 ml of acetone and mixed using a ball mill for 2 hours to be dissolved. 449 g of mezocarbon fiber (MCF) and 1 g of oxalic acid were added to the mixture and then mixed for 5 hours to form an anode active material composition.

The anode active material composition was coated on a copper foil having a thickness of 178 μm and a width of 5.1 cm using a doctor blade having a gap of 420 μm, and then dried to make a unit anode plate.

Separately from the above, a polyethylene separator (Asahi Chemical Industry Co., Ltd.) was used as a separator. Here, the width of the separator was 5.25 cm and the thickness thereof was 18 μm.

The polyethylene separator was interposed between the cathode and the anode and then wound in a jelly-roll type configuration to fabricate an electrode assembly. The fabricated electrode assembly was put into a pouch.

0.2 g of a polysiloxane-polyalkylene compound represented by formula (2) wherein m is 3, n is 3, x is 5, $R_2$, $R_3$ and $R_7$ are independently a methyl group, $R_5$ is CH$_2$=C(CH$_3$)—C(=O)—O—, $R_6$ is hydrogen, 1.8 g of polyethylene glycol dimethacrylate, 1 g of polyethylene glycol monomethacrylate, 0.05 g of ethoxylated trimethylolpropane triacrylate, 0.01 g of azobisisobutyronitrile and 30 g of a solution containing 1M LiPF$_6$ and EC/DMC/DEC in a mixture ratio by volume of 3:3:1, were mixed to prepare a gel electrolyte forming composition. 3 g of the composition was injected into the obtained pouch battery and hermetically sealed. Subsequently, the resultant was allowed to stand at an oven maintained at 80° C. for 4 hours, thereby completing a lithium secondary battery.

EXAMPLE 6

15 g of polyvinylidenefluoride was added to 600 ml of acetone and mixed using a ball mill for 2 hours to be dissolved. 470 g of LiCoO$_2$, and 15 g of Super-P were added to the mixture and then mixed for 5 hours to form a cathode active material composition.

The cathode active material composition was coated on an aluminum foil having a thickness of 147 μm and a width of 4.9 cm using a doctor blade having a gap of 320 μm, and then dried to make a unit cathode plate.

Next, a composition comprising 0.2 g of the polysiloxane-polyoxyalkylene compound represented by formula (2), which is the same as in Example 5, 1.8 g of polyethylene glycol dimethacrylate, 1 g of polyethylene glycol monomethacrylate, 0.05 g of ethoxylated trimethylolpropane triacrylate, 0.01 g of benzophenone and a solution containing 1M LiPF$_6$ and EC/DMC/DEC in a mixture ratio by volume of 3:3:1, were mixed to prepare a gel electrolyte forming composition. Subsequently, the composition was cast on the cathode plate using a doctor blade and then hardened by irradiating UV.

Then, an anode plate was fabricated as follows.

50 g of polyvinylidenefluoride was added to 600 ml of acetone and mixed using a ball mill for 2 hours to be dissolved. 449 g of mezocarbon fiber (MCF) and 1 g of oxalic acid were added to the mixture and then mixed for 5 hours to form an anode active material composition.

The anode active material composition was coated on a copper foil having a thickness of 178 μm and a width of 5.1 cm using a doctor blade having a gap of 420 μm, and then dried to make a unit anode plate.

Separately from the above, a polyethylene separator (Asahi Chemical Industry Co., Ltd.) was used as a separator. Here, the width of the separator was 5.25 cm and the thickness thereof was 18 μm.

The polyethylene separator was interposed between the cathode and the anode and then wound in a jelly-roll type configuration to fabricate an electrode assembly. The fabricated electrode assembly was put into a pouch, thereby completing a lithium secondary battery.

EXAMPLE 7

A lithium secondary battery was completed in the same manner as Example 6, except that the gel electrolyte forming composition was cast on an anode plate rather than a cathode plate.

EXAMPLE 8

A lithium secondary battery was completed in the same manner as Example 6, except that the gel electrolyte forming composition was cast on both a cathode plate and an anode plate.

COMPARATIVE EXAMPLE

A lithium secondary battery was completed in the same manner as in Example 1, except that a mixed solution containing 1M LiPF6 and EC/DMC/DEC (3:3:4), (Ube Industries, Ltd.), was used, instead of a gel electrolyte forming composition.

The reliability and safety of lithium secondary batteries prepared by Examples 1 through 8 and Comparative Example were evaluated. Here, in order to measure the reliability of a battery, a life characteristic of the battery was evaluated. Also, in order to test the safety of a battery, piercing tests, swelling tests under a high temperature (85° C.), and leakage tests under a pressure of 40 kgf/cm$^2$, were carried out.

Figure 3:
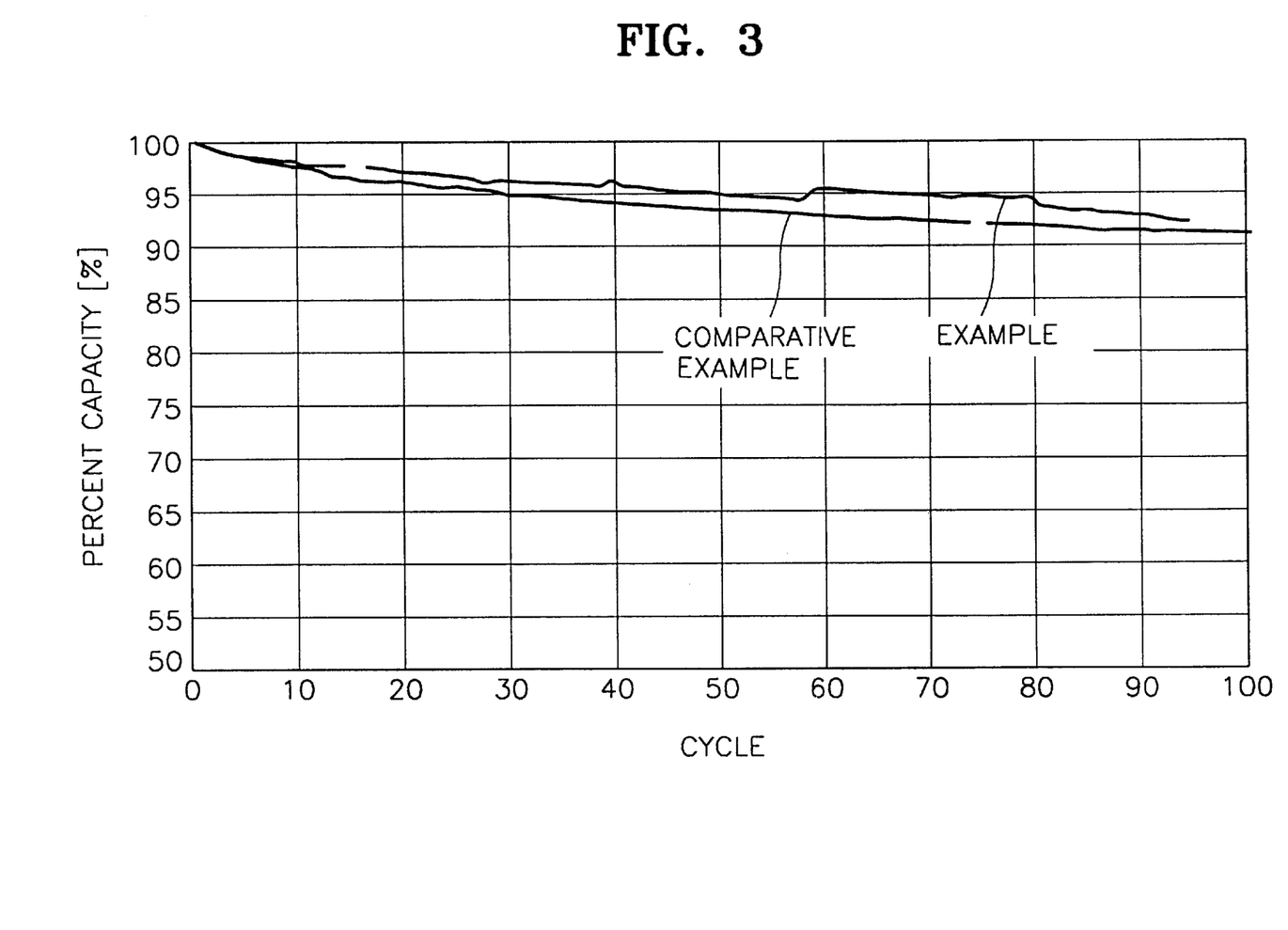
FIG. 3 is a graph showing life characteristics of a battery according to an example of the present invention and a battery according to a comparative example.

The test results showed that the lithium secondary batteries prepared by Examples 1 through 8 had substantially the same reliability, that is, battery life characteristics, as the battery prepared by Comparative Example in which the conventional organic electrolytic solution was used. In particular, the life characteristics of the batteries prepared by Example 1 and Comparative Example are shown in FIG. 3, in which a change in the battery capacity between both batteries was almost the same for 100 cycles.

Also, it was proved that the lithium secondary batteries prepared by Examples 1–8 were better than the lithium secondary battery prepared by Comparative Example in view of safety. This is because use of a gel electrolyte prevents the electrolyte from leaking outside or prevents the electrode assembly or pouch from being swollen due to the electrolyte.

According to the present invention, a lithium battery which has improved reliability and safety, can be attained by effectively suppressing a swelling phenomenon due to an electrolytic solution and preventing leakage of the electrolytic solution.

Although the present invention has been described with reference to the preferred examples, the foregoing disclosure should be interpreted as illustrative only and it should be understood that various modifications and variations can be easily made by those skilled in the art without departing from the spirit of the invention. Accordingly, a true scope and spirit of the invention should be defined by the following claims.

What is claimed is:

1. A polymeric gel electrolyte prepared by curing a composition comprising a polysiloxane compound represented by formula 1 or a polysiloxane-polyoxyalkylene compound represented by formula 2, a polyethylene glycol derivative represented by formula 3, and an organic solvent containing a lithium salt:

[Formula 1]

$R_1-O-(CH_2)_m-[Si(R_2R_3)-O]_n-Si(R_2R_3)-(CH_2)_n-O-R_4$

[Formula 2]

$R_5-O-(CH_2)_m-[Si(R_2R_3)-O]_n-Si(R_2R_3)-(CH_2)_m-O-(CH_2-CHR_6-O-)_x-R_7$

[Formula 3]

$H_2C=C(R')C(=O)(OCH_2CH_2)n-OR''$ wherein R1 is $-C(=O)CR_8=CR_9R_{24}$ or $-CR_{10}R_{11}R_{25}$, $R_2$ and $R_3$ are independently one selected from the group consisting of $C_aH_{(2a+1)}$ in which a is an integer from 1 to 5, phenyl, benzyl and allyl, $R_4$ is one selected from the group consisting of $-C(=O)CR_{12}=CR_{13}R_{14}$, $-CR_{15}R_{16}R_{17}$ and $-C_aH_{(2a+1)}$ (here, a is an integer from 1 to 5), $R_5$ and $R_7$ are independently $-C(O)CR_{18}=C(R_{19}R_{20})$ or $-CR_{21}(R_{22}R_{23})$, $R_6$ is hydrogen or $-C_aH_{(2a+1)}$ (here, a is an integer from 1 to 5), m is an integer from 1 to 5, n is an integer from 1 to 20, x is an integer from 1 to 15, and $R_8$, $R_9$, $R_{10}$, $R_{11}$, $R_{12}$, $R_{13}$, $R_{14}$, $R_{15}$, $R_{16}$, $R_{17}$, $R_{18}$, $R_{19}$, $R_{20}$, $R_{21}$, $R_{22}$, $R_{23}$, $R_{24}$ and $R_{25}$ are independently hydrogen or $-C_bH_{(2b+1)}$ in which b is an integer from 1 to 5, R' is hydrogen or $CH_3$, and R" is hydrogen, $-C(=O)CH=CH_2$ or $-C(=O)C(CH_3)=CH_2$.

2. The polymeric gel electrolyte according to claim 1, wherein the polyethylene glycol derivative is at least one selected from the group consisting of polyethylene glycol monomethacrylate, polyethylene glycol dimethacrylate, polyethylene glycol monoacrylate and polyethylene glycol diacrylate.

3. The polymeric gel electrolyte according to claim 1, wherein a content of the polysiloxane compound represented by formula 1 or the polysiloxane-polyoxyalkylene compound represented by formula 2 is 0.1 to 10 parts by weight, a content of the polyethylene glycol derivative represented by formula 3 is 0.4 to 50 parts by weight, and a content of the organic solvent containing the lithium salt is 50 to 97 parts by weight, based on 100 parts by weight of the composition.

4. The polymeric gel electrolyte according to claim 3, wherein the content of the lithium salt is 0.5 to 3 mol based on 1 liter of the organic solvent.

5. The polymeric gel electrolyte according to claim 1, wherein the composition further comprises ethoxylated trimethylolpropane triacrylate.

6. The polymeric gel electrolyte according to claim 5, wherein a content of the ethoxylated trimethylolpropane triacrylate is greater than 0 parts by weight and less than or equal to 5 parts by weight based on 100 parts by weight of the composition.

7. The polymeric gel electrolyte according to claim 5, wherein a content of the polysiloxane compound represented by formula 1 or the polysiloxane-polyoxyalkylene compound represented by formula 2 is 0.1 to 10 parts by weight based on 100 parts by weight of the composition, a content of the polyethylene glycol derivative represented by formula 3 is 0.4 to 50 parts by weight based on 100 parts by weight of the composition, a content of the ethoxylated trimethylolpropane triacrylate is greater than 0 parts by weight and less than or equal to 5 parts by weight based on 100 parts by weight of the composition, and a content of the organic solvent containing the lithium salt is 50 to 97 parts by weight based on 100 parts by weight of the composition.

8. The polymeric gel electrolyte according to claim 7, wherein the composition further comprises 0.1 to 5 parts by weight of at least one polymerization initiator selected from the group consisting of benzophenone, benzoyl peroxide, acetyl peroxide, lauroyl peroxide and azobisisobutyronitrile, based on 100 parts by weight of the composition.

9. The polymeric gel electrolyte according to claim 1, wherein the composition further comprises 0.1 to 5 parts by weight of at least one polymerization initiator selected from the group consisting of benzophenone, benzoyl peroxide, acetyl peroxide, lauroyl peroxide and azobisisobutyronitrile, based on 100 parts by weight of the composition.

10. The polymeric gel electrolyte according to claim 1, wherein the curing is performed by at least one method selected from the group consisting of thermal polymerization, electron beam polymerization and UV polymerization.

11. The polymeric gel electrolyte according to claim 1, wherein the thermal polymerization is performed at a temperature in the range from 60 to 100° C.

12. The polymeric gel electrolyte according to claim 1, the lithium salt is at least one selected from the group consisting of lithium perchlorate (LiClO$_4$), lithium tetrafluoroborate (LiBF$_4$), lithium hexafluorophosphate (LiPF$_6$), lithium hexafluoroarsenate (LiAsF$_6$), lithium trifluoromethanesulfonate (LiCF$_3$SO$_3$) and lithium bistrifluoromethanesulfonyl amide (LiN(CF$_3$SO$_2$)$_2$), and the organic solvent is at least one solvent selected from the group consisting of propylene carbonate, ethylene carbonate, dimethyl carbonate, methylethyl carbonate, diethyl carbonate, vinylene carbonate, triglyme, tetraglyme and γ-butyrolactone.

13. A lithium battery comprising: an electrode assembly having a cathode, an anode and a separator interposed between the cathode and the anode; and a gel electrolyte prepared by curing a composition comprising a polysiloxane compound represented by formula 1 or a polysiloxane-polyoxyalkylene compound represented by formula 2, a polyethylene glycol derivative represented by formula 3, and an organic solvent containing a lithium salt:

[Formula 1]

$R_1$—O—(CH$_2$)$_m$—[Si(R$_2$R$_3$)—O]$_n$—Si(R$_2$R$_3$)—(CH$_2$)$_n$—O—R$_4$

[Formula 2]

$R_5$—O—(CH$_2$)$_m$—[Si(R$_2$R$_3$)$_n$—O]$_n$—Si(R$_2$R$_3$)—(CH$_2$)$_m$—O—(CH$_2$—CHR$_6$—O—)$_x$—R$_7$

[Formula 3]

H$_2$C=C(R')C(=O)(OCH$_2$CH$_2$)$_n$—OR"

wherein R1 is —C(=O)CR$_8$=CR$_9$R$_{24}$ or —CR$_{10}$R$_{11}$R$_{25}$, R$_2$ and R$_3$ are independently one selected from the group consisting of C$_a$H$_{(2a+1)}$ in which a is an integer from 1 to 5, phenyl, benzyl and allyl, R$_4$ is one selected from the group consisting of —C(=O)CR$_{12}$=CR$_{13}$R$_{14}$, —CR$_{15}$R$_{16}$R$_{17}$ and —C$_a$H$_{(2a+1)}$ (here, a is an integer from 1 to 5.), R$_5$ and R$_7$ are independently —C(O)CR$_{18}$=C(R$_{19}$R$_{20}$) or —CR$_{21}$(R$_{22}$R$_{23}$), R$_6$ is hydrogen or —C$_a$H$_{(2a+1)}$ (here, a is an integer from 1 to 5), m is an integer from 1 to 5, n is an integer from 1 to 20, x is an integer from 1 to 15, and R$_8$, R$_9$, R$_{10}$, R$_{11}$, R$_{12}$, R$_{13}$, R$_{14}$, R$_{15}$, R$_{16}$, R$_{17}$, R$_{18}$, R$_{19}$, R$_{20}$, R$_{21}$, R$_{22}$, R$_{23}$, R$_{24}$ and R$_{25}$ are independently hydrogen or —C$_b$H$_{(2b+1)}$ in which b is an integer from 1 to 5, R' is hydrogen or CH$_3$, and R" is hydrogen, —C(=O)CH=CH$_2$ or —C(=O)C(CH$_3$)=CH$_2$; and a case accommodating the electrode assembly and the gel electrolyte.

14. The lithium battery according to claim 13, wherein the polyethylene glycol derivative is at least one selected from the group consisting of polyethylene glycol monomethacrylate, polyethylene glycol dimethacrylate, polyethylene glycol monoacrylate and polyethylene glycol diacrylate.

15. The lithium battery according to claim 13, wherein a content of the polysiloxane compound represented by formula 1 or the polysiloxane-polyoxyalkylene compound represented by formula 2 is 0.1 to 10 parts by weight, the content of the polyethylene glycol derivative represented by formula 3 is 0.4 to 50 parts by weight, and a content of the organic solvent containing a lithium salt is 50 to 97 parts by weight, based on 100 parts by weight of the composition.

16. The polymeric gel electrolyte according to claim 15, wherein the organic solvent comprises 4 to 15 mol of the lithium salt.

17. The lithium battery according to claim 13, wherein the composition further comprises ethoxylated trimethylolpropane triacrylate.

18. The lithium battery according to claim 17, wherein a content of the ethoxylated trimethylolpropane triacrylate is greater than 0 parts by weight and less than or equal to 5 parts by weight based on 100 parts by weight of the composition.

19. The polymeric gel electrolyte according to claim 17, wherein a polysiloxane compound or a polysiloxane-polyoxyalkylene compound, and a polyethylene glycol derivative, to form a first mixture.

20. The polymeric gel electrolyte according to claim 19, wherein the composition further comprises 0.1 to 5 parts by weight of at least one polymerization initiator selected from the group consisting of benzophenone, benzoyl peroxide, acetyl peroxide, lauroyl peroxide and azobisisobutyronitrile, based on 100 parts by weight of the composition.

21. The lithium battery according to claim 13, wherein the composition further comprises 0.1 to 5 parts by weight of at least one polymerization initiator selected from the group consisting of benzophenone, benzoyl peroxide, acetyl peroxide, lauroyl peroxide and azobisisobutyronitrile, based on 100 parts by weight of the composition.

22. The lithium battery according to claim 13, wherein the curing is performed by at least one method selected from the group consisting of thermal polymerization, electron beam polymerization and UV polymerization.

23. The lithium battery according to claim 22, wherein the thermal polymerization is performed at a temperature in the range from 60 to 100° C.

24. The lithium battery according to claim 13, wherein the lithium salt is at least one selected from the group consisting of lithium perchlorate (LiClO$_4$), lithium tetrafluoroborate (LiBF$_4$), lithium hexafluorophosphate (LiPF$_6$), lithium hexafluoroarsenate (LiAsF$_6$), lithium trifluoromethanesulfonate (LiCF$_3$SO$_3$) and lithium bistrifluoromethanesulfonyl amide (LiN(CF$_3$SO$_2$)$_2$), and the organic solvent is at least one solvent selected from the group consisting of propylene carbonate, ethylene carbonate, dimethyl carbonate, methylethyl carbonate, diethyl carbonate, vinylene carbonate, triglyme, tetraglyme and γ-butyrolactone.

25. The lithium battery according to claim 13 wherein the electrode assembly is a winding type and the case is a pouch.

26. The lithium battery according to claim 13, wherein the separator is formed of a polyethylene sheet, a polypropylene sheet or a combination thereof.

* * * * *